(12) United States Patent
Mohan et al.

(10) Patent No.: US 11,568,656 B2
(45) Date of Patent: Jan. 31, 2023

(54) 3D SEGMENTATION USING SPACE CARVING AND 2D CONVOLUTIONAL NEURAL NETWORKS

(71) Applicant: Lawrence Livermore National Security, LLC, Livermore, CA (US)

(72) Inventors: Kadri Aditya Mohan, Newark, CA (US); Kyle Champley, Pleasanton, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 307 days.

(21) Appl. No.: 17/032,377

(22) Filed: Sep. 25, 2020

(65) Prior Publication Data

US 2021/0097258 A1 Apr. 1, 2021

Related U.S. Application Data

(60) Provisional application No. 62/908,750, filed on Oct. 1, 2019.

(51) Int. Cl.
| | |
|---|---|
| *G06T 7/00* | (2017.01) |
| *G06V 20/64* | (2022.01) |
| *G06T 7/11* | (2017.01) |
| *G06K 9/62* | (2022.01) |
| *G06N 3/08* | (2006.01) |
| *G06N 3/04* | (2006.01) |

(52) U.S. Cl.
CPC .......... *G06V 20/64* (2022.01); *G06K 9/6232* (2013.01); *G06N 3/04* (2013.01); *G06N 3/08* (2013.01); *G06T 7/11* (2017.01); *G06T 2207/10116* (2013.01); *G06T 2207/20081* (2013.01); *G06T 2207/20084* (2013.01)

(58) Field of Classification Search
CPC .. G06V 20/64; G06V 10/7715; G06V 20/647; G06K 9/6232; G06N 3/04; G06N 3/08; G06N 3/0454; G06N 3/0481; G06T 7/11; G06T 2207/10116; G06T 2207/20081; G06T 2207/20084
See application file for complete search history.

(56) References Cited

U.S. PATENT DOCUMENTS

| | | | |
|---|---|---|---|
| 10,282,869 | B2 | 5/2019 | Champley |
| 2019/0130562 | A1* | 5/2019 | Liu ........................ G06T 7/0012 |
| 2021/0049756 | A1* | 2/2021 | He ........................ G06N 3/0454 |

OTHER PUBLICATIONS

Anirudh, R. et al. "Lose the views: Limited angle CT reconstruction via implicit sinogram completion." In 2018 IEEE/CVF Conference on Computer Vision and Pattern Recognition, pp. 6343-6352, Jun. 2018.

(Continued)

*Primary Examiner* — Ping Y Hsieh
(74) *Attorney, Agent, or Firm* — Perkins Coie LLP

(57) ABSTRACT

A system for generating a 3D segmentation of a target volume is provided. The system accesses views of an X-ray scan of a target volume. The system applies a 2D CNN to each view to generate a 2D multi-channel feature vector for each view. The system applies a space carver to generate a 3D channel volume for each channel based on the 2D multi-channel feature vectors. The system then applies a linear combining technique to the 3D channel volumes to generate a 3D multi-label map that represents a 3D segmentation of the target volume.

20 Claims, 4 Drawing Sheets

(56) References Cited

OTHER PUBLICATIONS

Chen, G.-H et al. "Prior image constrained compressed sensing (PICCS): A method to accurately reconstruct dynamic CT images from highly undersampled projection data sets." Medical Physics, 35(2):660-663, 2008.

Chen, H. et al. "Low-dose CT with a residual encoderdecoder convolutional neural network." IEEE Transactions on Medical Imaging, 36(12):2524-2535, Dec. 2017.

Feldkamp, L.A et al. "Practical cone-beam algorithm." J. Opt. Soc. Am. A, 1(6):612-619, Jun. 1984.

Goodfellow, I. et al. "Deep Learning," Massachusetts Institute of Technology, 2016, p. 178-182.

Gupta, H. et al. "CNN-based projected gradient descent for consistent CT image Yeconstruction." IEEE Transactions on Medical Imaging, 37(6):1440-1453, Jun. 2018.

Huang, G. et al. and Springer International Publishing, Densely Connected Convolutional Networks, arXiv:1608.06993, 2016.

Jin, K.H. et al. "Deep convolutional neural network for inverse problems in imaging." IEEE Transactions on Image Processing, 26(9):4509-4522, Sep. 2017.

Kak, A.C. et al. "Principles of Computerized Tomographic Imaging." Society of Industrial and Applied Mathematics, 2001.

Kutulakos, K.N. et al. "A theory of shape by space carving." In Proceedings of the Seventh IEEE International Conference on Computer Vision, vol. 1, pp. 307-314, Sep. 1999.

McCann, M.T et al. "Convolutional neural networks for inverse problems in imaging: A review." IEEE Signal Processing Magazine, 34(6):85-95, Nov. 2017.

Mohan, K. Aditya et al. "TIMBIR: A method for time-space reconstruction from interlaced views." IEEE Transactions on Computational Imaging, 1(2):96-111, Jun. 2015.

Navab, N. et al., editors, "Medical Image Computing and Computer-Assisted Intervention—MICCAI 2015", pp. 234-241.

Ritschl, L. et al. "Improved total variation-based CT image reconstruction applied to clinical data." Physics in Medicine and Biology, 56(6):1545-1561, Feb. 2011.

Ronneberger, O. et al. "U-net: Convolutional networks for biomedical image segmentation," arXiv:1505.4597v.1, May 18, 2015, 8 pages, <http://lmb.informatik.uni-freiburg.de/>.

Sidky, E.Y. et al. "Image reconstruction in circular cone-beam computed tomography by constrained, totalvariation minimization." Physics in Medicine and Biology, 53(17):4777-4807, Aug. 2008.

Vandeghinste, B. et al. "Iterative CT reconstruction using shearlet-based regularization." IEEE Transaction on Nuclear Science, 60(5):3305-3317, Oct. 2013.

Xu, Q. et al. "Low-dose X-ray CT reconstruction via dictionary learning." IEEE Transactions on Medical Imaging, 31(9):1682-1697, Sep. 2012.

Ye, D.H. et al. "Deep back projection for sparse-view CT reconstruction." In 2018 IEEE Global Conference on Signal and Information Processing (GlobalSIP), pp. 1-5, Nov. 2018.

\* cited by examiner

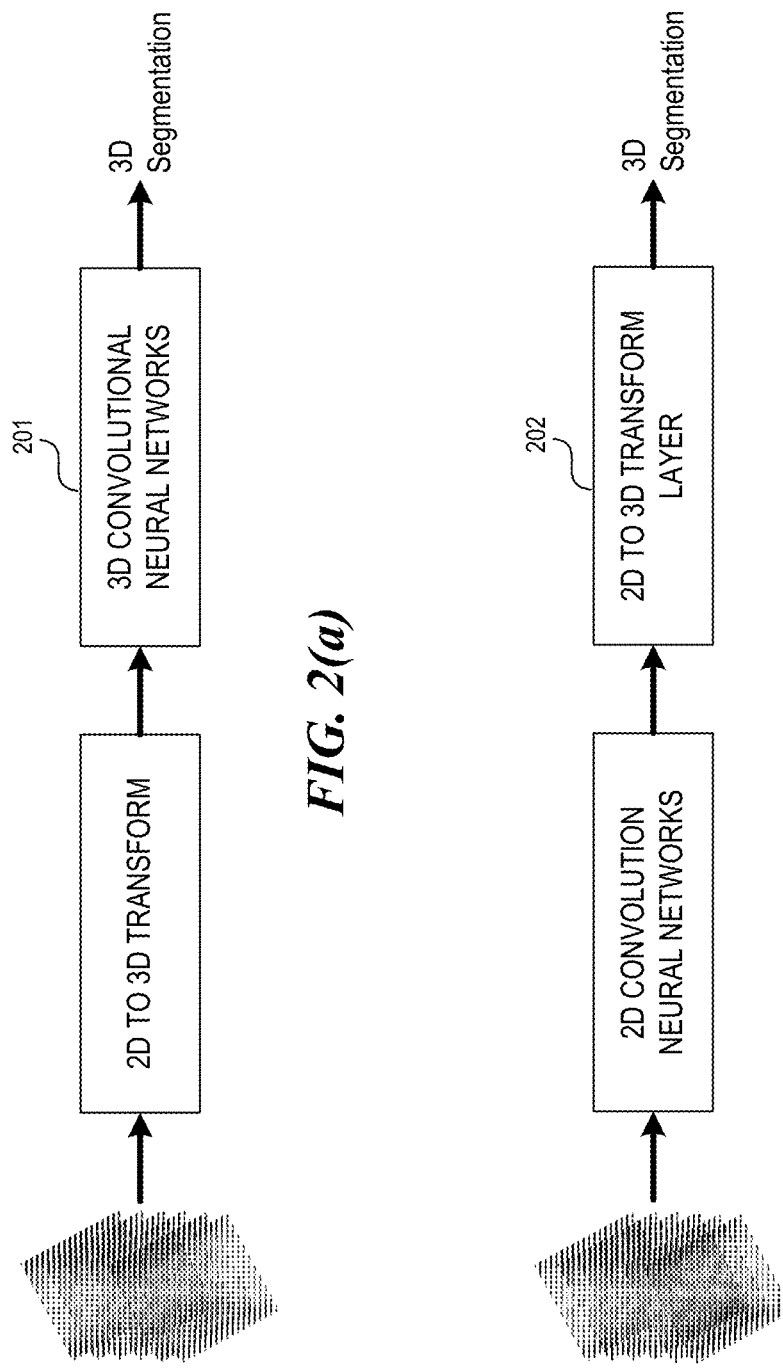

3D SEGMENTATION USING SPACE CARVING AND 2D CONVOLUTIONAL NEURAL NETWORKS

CROSS-REFERENCE TO RELATED APPLICATION(S)

This application claims the benefit of priority to U.S. Provisional Patent Application No. 62/908,750 filed on Oct. 1, 2019, which is hereby incorporated by reference in its entirety.

STATEMENT REGARDING FEDERALLY SPONSORED RESEARCH

The United States government has rights in this invention pursuant to Contract No. DE-AC52-07NA27344 between the U.S. Department of Energy and Lawrence Livermore National Security, LLC, for the operation of Lawrence Livermore National Laboratory.

BACKGROUND

In many environments, there is a need to identify regions of interest within an image. For example, in an airport, an image generated from a scan of a bag may need to be analyzed to determine whether the bag contains any prohibited objects (i.e., regions of interest). As another example, in a medical environment, an image generated from a scan of a patient may need to be analyzed to determine whether the patient has a tumor. The scanning technology may be computed tomography ("CT"), and the images may be three-dimensional ("3D") images.

Computed Tomography is a technique that noninvasively generates cross-sectional images of the linear attenuation coefficients ("LACs") of materials in an object of interest. CT has been used extensively in medical and security applications such as for generating a scan of a brain or a scan of baggage at an airport. The LAC is a measure of the attenuation of X-rays as the X-rays pass through a certain material and is in units of inverse length (e.g., per centimeter). To generate the LACs, CT employs an X-ray source and an X-ray detector. The X-ray source transmits X-rays through the object with an initial intensity, and the X-ray detector, which is on the opposite side of the object from the source, measures the final intensities of the X-rays that pass through the object and impinge on pixels of a detector. CT collects measurements by positioning the source and detector at various angles relative to the object and collecting the measurements of the final intensity at each angle. The measurements for an angle are referred to as a projection or a view. The measurements of the intensities may be represented as a negative of a logarithm of a ratio of transmission data of a scan of the object to transmission data of a scan without the object (e.g., scan of air). Various techniques may be used to collect measurements at different angles relative to the object. For example, the source and detector may be stationary and the object may be rotated, the object may be stationary and the source and detector may be rotated, and multiple stationary transmitters and detectors may be positioned at different angles. CT algorithms then reconstruct from the collection of measurements a 3D image of the object that specifies the LAC for each volume element ("voxel") within the 3D volume that the object is within. The cross-sectional images may be generated from the 3D image.

A forward model may be used to represent the relationship between the unknown 3D volume (e.g., that includes an object) and the CT measurements as represented by the following equation:

$$Af=g$$

where g represents a vector of the measurements, f represent a vector with an LAC for each voxel, and A represent a forward projection matrix. The forward projection matrix indicates which voxels an X-ray passed through in travelling from the X-ray source to the X-ray detector. The goal of CT is to determine f given A and g.

Conventional CT requires that the number of projections be roughly equal to the number of pixels in a projection. In practice, the number of projections that can be collected may be severely limited for various reasons. For example, some CT protocols require that the X-ray dose delivered to the object (e.g., baggage or patient) be limited. One way to reduce the dose is to limit the number of projections that are collected. As another example, CT systems that are flux-limited may employ long integration times per projection to collect adequate measurements. CT systems may be flux-limited because of dim sources (low current), large source-to-detector distances, small detector pixels, and/or highly attenuating objects. To increase throughput, a flux-limited CT system may have time to generate only a small number of projections. As another example, when the object is in motion (e.g., a beating human heart), a CT system may deliberately collect a limited number of projections to shorten the data acquisition time to reduce the artifacts associated with the object motion. As another example, some CT systems employ multiple source-detector pairs mounted on a stationary gantry (e.g., for scanning carry-on baggage at an airport). The projections of such a CT system are limited by the number of sources.

When the number of projections is limited to one or more orders of magnitude smaller than the number pixels in a projection, a problem arises in that the reconstructed 3D image is generally polluted with streak artifacts. This problem is referred to as the few-view reconstruction problem. The few-view reconstruction problem arises because the number of unknowns (i.e., the number of voxels) is much greater than the number of linear equations represented by the projections and the measurements are noisy.

BRIEF DESCRIPTION OF THE DRAWINGS

FIGS. 2(a) and 2(b) illustrate differences in an alternative deep learning architecture and the CTIS system architecture.

DETAILED DESCRIPTION

Figure 1B:
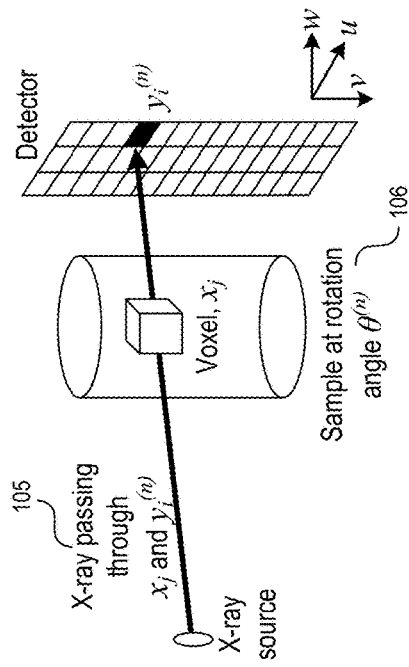
FIG. 1(b) shows the location of pixels that are affected by a given voxel as determined by drawing a straight line from the X-ray point source through the voxel.

A CT image segmentation ("CTIS") system inputs views collected during a CT scan of a target volume (i.e., a 3D volume) and outputs a 3D multi-label map representing a segmentation of the target volume. The 3D multi-label map includes for each voxel a probability distribution of the voxel belonging to each class label. For example, each label may represent one type of object such as a metal object or a plastic object and the 3D multi-label map indicates the probability for each voxel to belong to a particular object type. In some embodiments, the CTIS system collects views or projections of the target volume from different angles of the X-ray source relative to the target volume. In some embodiments, the CTIS system inputs each view into a 2D convolutional neural network ("CNN") layer that has a 2D CNN for each view. The output of each 2D CNN is a 2D multi-channel feature map that includes, for each pixel of the view, a feature vector having a channel value for each channel. The output represents a rasterization of the channel values for each channel. Thus, the output of the 2D CNN layer is a 2D multi-channel feature map for each view. The CTIS system inputs the 2D multi-channel feature maps to a 2D-to-3D transform layer that combines the feature vectors of the 2D multi-channel feature maps to generate the 3D multi-label map. In some embodiments, the 2D-to-3D transform layer includes a space carver layer and a linear combining layer. The space carver layer is informed by the backprojector operator, $P^T$, which contains information on the geometrical characteristics of X-ray propagation. For each channel, the space carver layer inputs the 2D feature vectors for that channel (i.e., the same channel from each view or 2D CNN) and performs a 2D-to-3D transform on the feature vectors to generate a 3D feature vector for that channel. The linear combining layer inputs the 3D feature vector for each channel generated by the space carver layer, performs a linear summation of the 3D feature vectors, and computes a softmax function of each voxel to generate the 3D multi-label map, which is a segmentation of the target volume. The softmax function represents the probability distribution over multiple classes. (See, Goodfellow, I.; Bengio, Y., and Courville, A., "Deep Learning," Massachusetts Institute of Technology, 2016, p. 178-182.)

The CTIS system requires less computer resources (e.g., memory and computational power) than some prior reconstruction algorithms that simultaneously reconstruct the entire 3D volume. These prior reconstruction algorithms are used for views collected using popular geometries such as cone-beam or fixed-gantry computed tomography used in industrial imaging and helical-scan used in medical imaging. Although some prior reconstruction algorithms do not simultaneously reconstruct the entire 3D volume and thus require less computer resources, they are used only for certain scanner geometries such as parallel-beam or fan-beam. The CTIS system is not limited to such scanner geometries while simultaneously reconstructing the entire 3D volume.

One approach to 3D reconstruction is based on direct inversion of the forward model that expresses the X-ray images as a function of the LACs. However, this approach requires a large number of images densely acquired at several views around the 3D volume and cause streaking artifacts when the number of views is less. In many applications, only a few number of views, in the range of 5-15, can be acquired due to, for example, experimental or dose limitations. In fixed-gantry X-ray CT, several pairs of X-ray sources and X-ray detectors are placed in a 3D arrangement around the 3D volume and views are acquired simultaneously. Hence, each new view of the object requires the installation of a new X-ray source and X-ray detector which may not be feasible in certain applications. In biological imaging, increasing the number of views will increase the dose that may damage the tissue of a patient.

Regularized iterative algorithms have been used for 3D reconstruction when the noise is high or the number of views is low. These algorithms achieve higher quality than direct inversion methods by minimizing a certain sparsifying criterion over the 3D reconstructed values. However, these algorithms fail by causing artifacts or excessive smoothing when the views are severely limited like in fixed-gantry X-ray CT where the number of views is typically less than 20. Furthermore, since the interim LAC values progressively move towards the solution over several iterates, these algorithms are also computationally expensive.

In some embodiments, the CTIS system helps solve for the few-view 3D imaging problem using a neural network architecture that may use 2D CNNs to perform 2D processing of the views followed by a 2D-to-3D transformation. Because the CTIS system uses 2D convolutions, the computational and memory costs are much lower than if 3D convolutions were used. The CTIS system can be used with various scanner technologies such as cone beam scanners, helical scanners, and fixed-gantry CT scanners. In addition, although the CTIS system is described primarily in the context of X-ray scanner, the CTIS system can be used with acoustic scanners and other electromagnetic scanners. As used herein, the term "object" refers a volume of material within a 3D volume. For example, the object may be a gun, and the 3D volume may be luggage that contains the object. Also, the object may fill the 3D volume or may be partially outside of the 3D volume. The 3D volume may be in any shape such as cubic or spherical.

Although the CTIS system is described primarily in the context of generating a 3D segmentation of a 3D volume, the CTIS system may also be adapted to generate 2D segmentations of slices of the 3D volume. Those 2D segmentations can then be combined to form a 3D segmentation. The generation of 3D segmentations for certain types of scanners such as parallel beam and fan-beam is typically performed by combining such 2D segmentations. To support the generating of such 2D segmentations, the CTIS system employs a 1D CNN layer and a 1D-to-2D transform layer rather than a 2D CNN layer and a 2D-to-3D transform layer. The 1D CNN layer may include a 1D CNN for each view. To generate a 2D segmentation representing a slice of a 3D volume, for each view, the pixels of that view corresponding to that slice are input to a 1D CNN. The pixels corresponding to a slice are pixels of each view that have the same linear alignment that is in the same row or column. Each 1D CNN generates a 1D multi-channel feature map that is analogous to the 2D multi-channel feature map that is output by a 2D CNN. The CTIS system then inputs the 1D multi-channel feature maps to the space carver layer of the 1D-to-2D transform layer. The space carver layer generates a 2D feature vector for each channel. The linear combining layer combines the 2D feature vectors to generate the 2D segmentation of a slice. The 2D segmentations for each slice can then be combined into a 3D segmentation of the 3D volume.

Figure 1A:
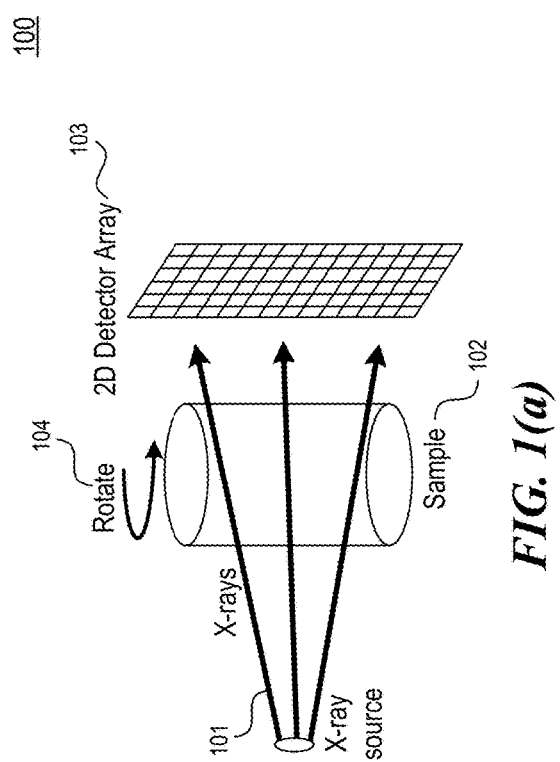
FIG. 1(a) illustrates a typical X-ray imaging system using cone-beam X-rays.

FIG. 1(a) illustrates a typical X-ray imaging system using cone-beam X-rays. The X-ray source 100 emits a diverging beam of X-ray radiation 101 that penetrates the sample (or target volume) 102 and the attenuated X-ray beam emerging out of the sample is recorded by a 2D detector array 103 as a view. In this X-ray imaging system, the sample is rotated 104 and views are collected at various angles. Alternatively, the sample may be stationary. In such a case, the X-ray source and the 2D detector array may revolve around the sample collecting view at various angles, or there may be multiple stationary X-ray sources and 2D detector arrays at various angles (in two or three dimensions) surrounding the sample.

The interior morphology of a target volume may be characterized by the variation in its LACs, which is a physical quantity that expresses the magnitude of X-ray attenuation as a function of position within the target volume. The mathematical relation between the LAC $\mu(r)$ and a measurement $\lambda_i^{(n)}$ at pixel index i and view index n is represented by the following equation:

$$\lambda_i^{(n)} = \bar{\lambda}_i \exp(-\int_{L_i^{(n)}} \mu(r) dr), \quad (1)$$

where $\bar{\lambda}_i$ is the measurement in the absence of an object, r is a position vector in 3D space, and $L_i^{(n)}$ is the line of integration along the direction of X-ray propagation. FIG. 1(b) illustrates an X-ray passing through a voxel of the sample and impacting a pixel of the 2D detector array. X-ray 105 passes through voxel $x_j$ and impacts pixel $\lambda_i^{(n)}$ at when the X-ray source is at an angle $\theta^{(n)}$ Equation 1 is non-linear in $\mu(r)$ but can be transformed to a linear relation by expressing the line integral in terms of the projection $y_j^{(n)} = -\log(\lambda_i^{(n)}/\bar{\lambda}_i)$ as indicated by the following equation:

$$y_i^{(n)} = \int_{L_i^{(n)}} \mu(r) dr. \quad (2)$$

To computationally reconstruct the LAC, the continuous LAC $\mu(r)$ is first discretized. The vector x is a vector of LAC values over all the voxels within the target volume. Since line integration is a linear operation, a matrix $A^{(n)}$ may be used to represent the transformation from x to $y^{(n)}$ as represented by the following equation:

$$y^{(n)} = A^{(n)} x, \quad (3)$$

where $y^{(n)}$ is a vector of all log-normalized detector measurements $y_i^{(n)}$.

Figure 1C:
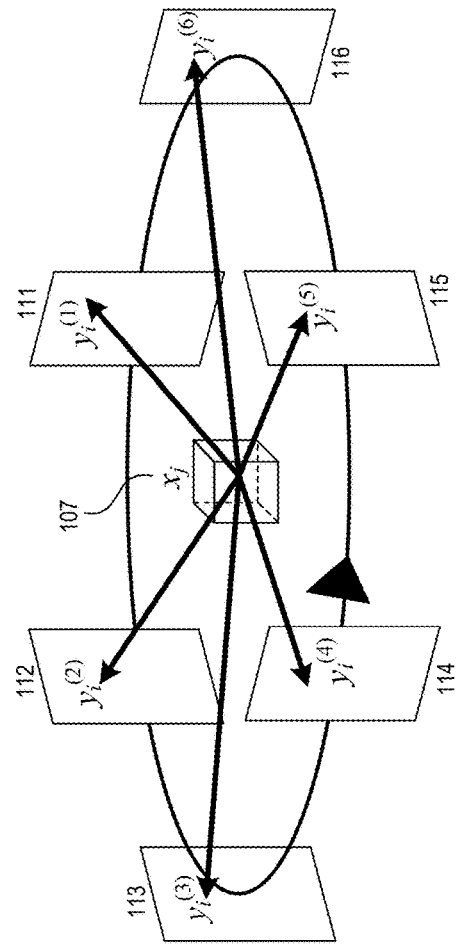
FIG. 1(c) illustrates pixels impacted by an X-ray passing through a voxel at various angles the X-ray source.

Unlike traditional computer vision using visible light cameras, every voxel in the sample volume affects the measurement at one or more pixels of the 2D detector. In normal operations, there is no occlusion since every material within the target volume is assumed to be translucent to X-rays. In rare cases, occlusion may occur if there is some heavy metal which completely attenuates all X-rays passing through it. As shown in FIG. 1(b), the location of pixels that are affected by a given voxel $x_j$ is determined by drawing a straight line from the X-ray point source through the voxel $x_j$. As long as the voxel is within the field of view of the detector, pixels that are impacted by the voxel at every view angle can be identified. FIG. 1(c) illustrates pixels impacted by an X-ray passing through a voxel at various angles the X-ray source. The X-ray passing through voxel $x_j$ at six angles $\theta^{(1)}$ through $\theta^{(6)}$ 111-116 impact pixel $y_i^{(1)}$ to $y_i^{(6)}$ at each of the six angles.

FIGS. 2(a) and 2(b) illustrates differences in an alternative deep learning architecture and the CTIS system architecture. The alternative deep learning architecture of FIG. 2(a) is for a limited view (or angle) CT imaging. Such an architecture is well-suited those CT geometries where 3D reconstruction can be performed by slicing together multiple 2D images from the output of neural networks. If the architecture is extended to fully 3D imaging geometries such as cone-beam CT, the extended architectures would use 3D CNNs 201. Such an architecture would require a prohibitively large amount of computer resources because 3D CNNs perform 3D convolutions while storing and processing 3D volumes instead of 2D images at each layer. The CTIS system, in contrast, performs neural network processing of 2D images (the views) and employs a memory efficient 2D-to-3D transform layer with only a few trainable parameters. The CTIS system architecture of FIG. 2(b) employs a 2D-to-3D transform layer 202 to generate a 3D segmentation of the 3D volume without using a 3D CNN and thus avoids the associated high computational and memory costs.

Figure 3:
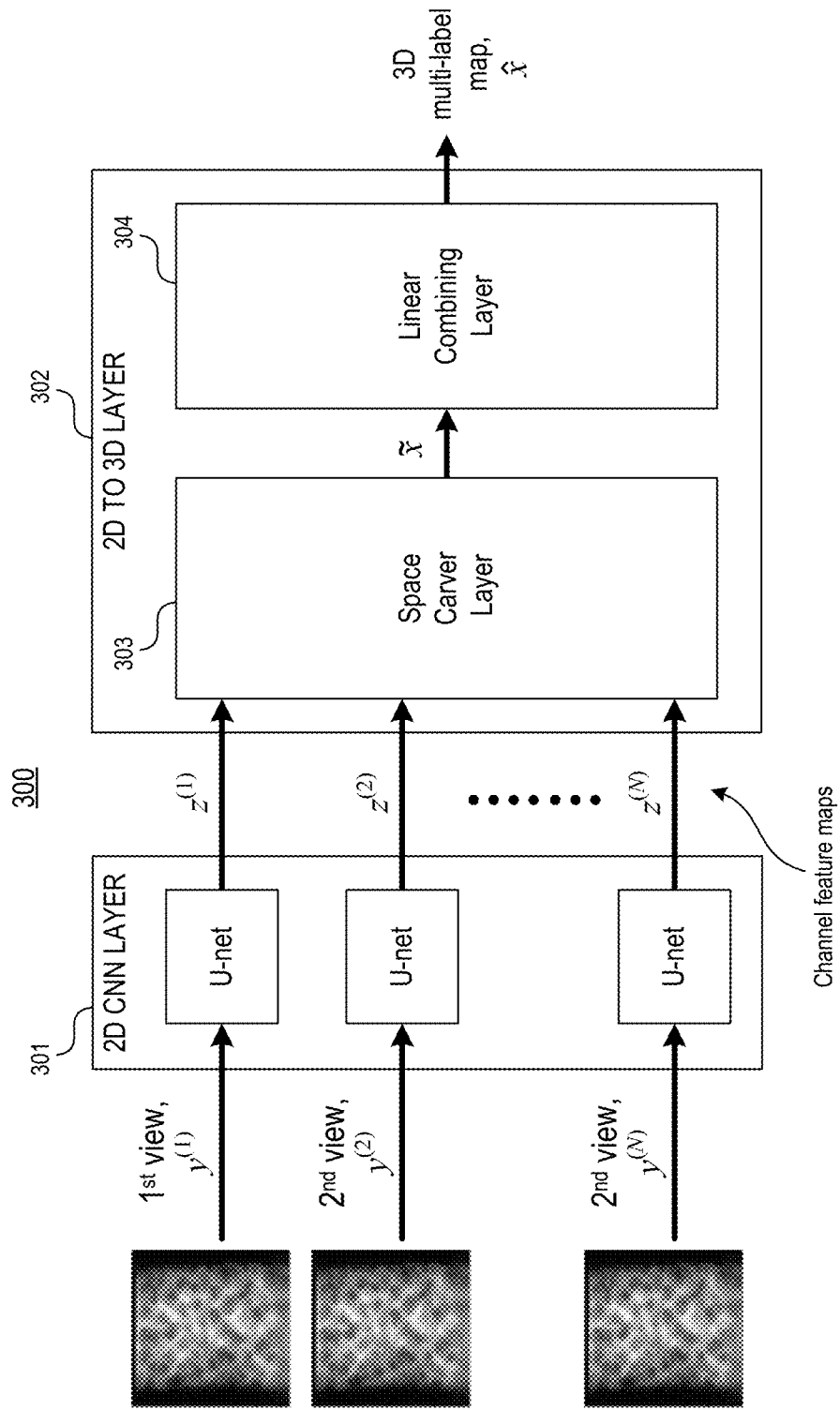
FIG. 3 is a block diagram that illustrates the CTIS system architecture in some embodiments.

FIG. 3 is a block diagram that illustrates the CTIS system architecture in some embodiments. The CTIS system architecture 300 includes a 2D CNN layer 301 and a 2D-to-3D transform layer 302. The 2D CNN layer includes multiple 2D CNNs. The 2D-to-3D transform layer includes a space carver layer 303 and linear combining layer 304. Each view $y^{(n)}$ is input to a 2D CNN that produces a 2D multi-channel feature map $z^{(n)}$ at its output. The vector $y^{(n)}$ represents view n in raster order, and the vector $z^{(n)}$ represents a 2D multi-channel feature vector at the output of the $n^{th}$ 2D CNN in raster order. The 2D CNNs can be any convolutional neural network such as a U-net, densenet, etc. (See, O. Ronneberger, P. Fischer, and T. Brox. U-net: Convolutional networks for biomedical image segmentation. In N. Navab, J. Hornegger, W. M. Wells, and A. F. Frangi, editors, *Medical Image Computing and Computer-Assisted Intervention— MICCAI* 2015, pages 234-241, Cham, 2015. Springer International Publishing and G. Huang, Z. Liu, L. van der Maaten, and K. Q. Weinbergers, "Densely Connected Convolutional Networks, arXiv: 1608.06993, 2016, which are hereby incorporated by reference.) Each 2D multi-channel feature vector that is output by a 2D CNN is an input to the space carver layer that space carves multiple 3D volumes, $\tilde{x}_i$ one each for channel of $z^{(n)}$. The linear combining layer performs a weighted linear combination of all the 3D volumes and applies a softmax function to produce a 3D segmentation $\hat{x}$. The CTIS system architecture may alternatively employ a combining layer that is not linear.

Figure 4:
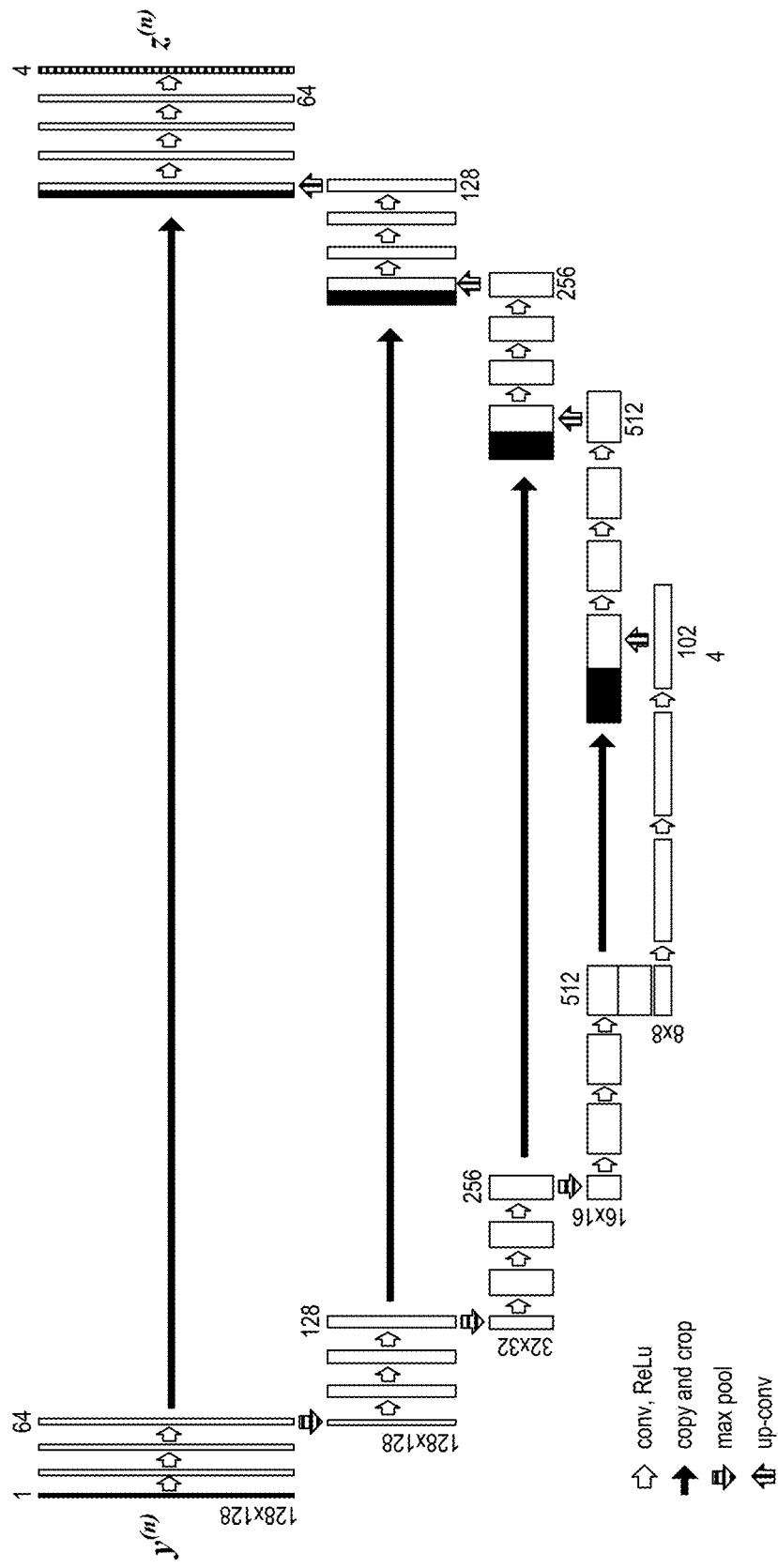
FIG. 4 shows an architecture of U-net that uses a multi-resolution approach to process images by progressively downsampling and then upsampling an image via a downsampling path that uses a pooling operator and an upsampling path that uses an upsampling operator.

In some embodiments, the CTIS system may use a U-net architecture for the 2D CNNs. The CTIS system employs U-nets with shared parameters to process the views. FIG. 4 shows an architecture of U-net that uses a multi-resolution approach to process images by progressively downsampling and then upsampling an image via a downsampling path that uses a pooling operator and an upsampling path that uses an upsampling operator. The last layer of the U-net does not use any activation function such as sigmoid, softmax, or ReLU. The purpose of the U-net is to produce a soft 2D representation of the segmentation of distinctive features in the target volume. The space carver layer then combines the 2D segmentations of the views and carves a 3D channel volume for each channel. The majority of the processing occurs in the 2D U-nets and this results in savings in memory cost when compared to 3D CNN architecture.

Although the CTIS system is described above as employing a 2D CNN layer to generate the 2D multi-channel feature maps, other machine learning techniques may be used. For example, an autoencoder may be used to generate a latent representation of each view and that latent representation is input into a neural network that outputs the 2D multi-channel feature map for that view. The layer that generates the 2D multi-channel feature maps may more generally be referred to as a feature map layer with the 2D CNN layer being an example of such a feature map layer.

The space carver layer computes the column normalized projection matrix $\tilde{A}^{(n)}$, whose matrix element $\tilde{A}_{k,j}^{(n)}$ is given by the following equation:

$$\tilde{A}_{k,j}^{(n)} = \begin{cases} \dfrac{A_{k,j}^{(n)}}{\sum_k A_{k,j}^{(n)}}, & \text{if } \sum_k A_{k,j}^{(n)} > 0 \\ 0 & \text{otherwise} \end{cases} \quad (4)$$

where $\tilde{A}_{k,j}^{(n)} \geq 0$. For every $i^{th}$ channel, the space carver layer space carves a 3D volume $\tilde{x}_i$ from $z_i^{(n)}$ over all views indexed by n, where $z_i^{(n)}$ is a vector of all pixel values in the channel of $z^{(n)}$ in raster order. The voxel value for $\tilde{x}$ are represented by the following equation:

$$\tilde{x}_{i,j} = (\Pi_{n=1}^{N} \sigma(\Sigma_k \tilde{A}_{k,j}^{(n)} z_{i,k}^{(n)}))^{1/N} \quad (5)$$

where N is the number of views, $z_{i,k}^{(n)}$ represents the $k^{th}$ pixel value of $z_i^{(n)}$, and $\sigma$ is the sigmoid activation function. The computation for $\tilde{x}_{i,j}$ based on this equation may be prone to overflow errors. To avoid these errors, the CTIS system may compute $\tilde{x}_{i,j}$ using the following equation:

$$\tilde{x}_{i,j} = \exp\left(-\frac{1}{N}\sum_{n=1}^{N}\log\left(\exp(0) + \exp\left(-\sum_k \tilde{A}_{k,j}^{(n)} z_{i,k}^{(n)}\right)\right)\right) \quad (6)$$

The voxel value $\tilde{x}_{i,j}$ depends on those pixel values $z_{i,k}^{(n)}$ for which $\tilde{A}_{k,j}^{(n)} \neq 0$ that is only those pixels that are affected by voxel j, as shown in FIG. 1(b), contribute to the value of $\tilde{x}_{i,j}$. In equation 6, within the outer exponential, the computation of the logarithm of the sum of the exponentials for each n is numerically stabilized.

The linear combining layer linearly combines all the space carved volumes over all the channels indexed by i and applies softmax activation to arrive at the final 3D multi-label map $\tilde{x}$ the 3D segmentation. This linear combination recovers non-convex shapes. Thus, the $j^{th}$ voxel value, $\hat{x}_j$, of the 3D segmentation output may be represented by the following equation:

$$\hat{x}_j = softmax\left(\sum_i w_i \tilde{x}_{i,j}\right) + b, \quad (7)$$

where softmax is softmax activation function, $w_i$ is the weight parameter, and b is the bias. Softmax is an activation function that provides for multi-label classification.

The CTIS system architecture illustrated in FIG. 3 produces a 3D segmentation of the target volume as represented by the 3D multi-label map. This 3D segmentation can be used as prior information by an appropriately designed iterative algorithm to produce a 3D reconstruction of the target volume.

The 3D segmentation may be used to obtain information on the location of edges or boundaries of uniform valued regions. The target volume can be reconstructed by solving the following equation:

$$\tilde{x} = \arg\min_x \left\{\sum_{n=1}^{N} \|y^{(n)} - A^{(n)}x\|^2 + \sum_{(j,i) \in \mathcal{N}} \beta v_j \rho(x_j - x_i)\right\} \quad (8)$$

where $\tilde{x}$ is the reconstructed volume, $\rho(\Delta)$ is a penalty function such as $|\Delta|^2$ or $|\Delta|$, $\mathcal{N}$ is a set of all pairs of neighboring voxel indices, $\beta$ is a regularization parameter, and $v_j$ is proportional to the probability that the segmented voxel $\hat{x}_j$ is not an edge. The vector $v_j$ ensures that the regularization is low if the $j^{th}$ voxel is an edge and is high if it is not an edge. The regularization parameter may be chosen to be a large value such that the reconstructed volume $\tilde{x}$ is very smooth in regions with no edges.

Another approach to reconstruct the target volume assumes that the voxel values within each label in the segmentation are approximately equal. Under this assumption, the approach only needs to reconstruct as many values as the number of labels in the segmentation. Since the number of labels is typically a small number (in many cases, less than 10), this problem can be solved using iterative least squares. (See, U.S. Pat. No. 10,282,869, Title: "Few-View Image Reconstruction;" Applicant: Lawrence Livermore National Security, LLC; Inventor: Kyle Champley.)

In some embodiments, the CTIS system performs machine learning training to learn weights of the 2D CNNs, the space carver layer, and the linear combining layer. The CTIS system access training data that represent training views of training volumes and labels each training volume with a training 3D segmentation. The CTIS system concurrently inputs the views to the 2D CNNs, inputs the output of the CNNs to the space carver layer, inputs the output of the space carver layer to a linear combining layer. The output of the linear combining layer represents a 3D segmentation of the object. The CTIS system then applies a loss function that indicates how closely the output 3D segmentations match the training segmentations. The CTIS system may select new weights using a gradient descent technique and repeat the process with the new weight. The training is complete when the loss function indicates that a termination criterion is satisfied. The training data may be collected from X-rays scan of target volumes or generated based on simulated X-rays and simulated 3D segmentation. In additional, the 2D CNN layer may be replaced by a 2D machine learning layer that does not include CNNs. For example, the 2D machine learning layer may include neural network that are not convolutional.

Convolutional neural networks ("CNNs") are a type of neural network that has been developed specifically to process images. A CNN may be used to input an entire image and output a classification of the image. For example, a CNN can be used to automatically determine whether a scan of a patient indicates the presence of a tumor. A CNN has multiple layers such as a convolution layer, a rectified linear unit ("ReLU") layer, a pooling layer, a fully connected ("FC") layer, and so on. Some more complex CNNs may have multiple convolution layers, ReLU layers, pooling layers, and FC layers.

A convolution layer may include multiple filters (also referred to as kernels or activation functions). A filter inputs a convolution window of an image, applies weights to each pixel of the convolution window, and outputs an activation value for that convolution window. For example, if the image is 256 by 256 pixels, the convolution window may be 8 by 8 pixels. The filter may apply a different weight to each of the 64 pixels in a convolution window to generate the activation value also referred to as a feature value. The convolution layer may include, for each filter, a node (also referred to a neuron) for each pixel of the image assuming a stride of one with appropriate padding. Each node outputs a feature value based on a set of weights for the filter that are learned during a training phase for that node. Continuing with the example, the convolution layer may have 65,536 nodes (256*256) for each filter. The feature values generated by the nodes for a filter may be considered to form a convolution feature map with a height and width of 256. If an assumption is made that the feature value calculated for a convolution window at one location to identify a feature or characteristic (e.g., edge) would be useful to identify that feature at a different location, then all the nodes for a filter can share the same set of weights. With the sharing of weights, both the training time and the storage requirements can be significantly reduced. If each pixel of an image is represented by multiple colors, then the convolution layer may include another dimension to represent each separate color. Also, if the image is a 3D image, the convolution layer may include yet another dimension for each image within the 3D image. In such a case, a filter may input a 3D convolution window.

The ReLU layer may have a node for each node of the convolution layer that generates a feature value. The generated feature values form a ReLU feature map. The ReLU layer applies a filter to each feature value of a convolution feature map to generate feature values for a ReLU feature map. For example, a filter such as max(0, activation value) may be used to ensure that the feature values of the ReLU feature map are not negative.

The pooling layer may be used to reduce the size of the ReLU feature map by downsampling the ReLU feature map to form a pooling feature map. The pooling layer includes a pooling function that inputs a group of feature values of the ReLU feature map and outputs a feature value. For example, the pooling function may generate a feature value that is an average of groups of 2 by 2 feature values of the ReLU feature map. Continuing with the example above, the pooling layer would have 128 by 128 pooling feature map for each filter.

The FC layer includes some number of nodes that are each connected to every feature value of the pooling feature maps. For example, if an image is to be classified as being a cat, dog, bird, mouse, or ferret, then the FC layer may include five nodes whose feature values provide scores indicating the likelihood that an image contains one of the animals. Each node has a filter with its own set of weights that are adapted to the type of the animal that the filter is to detect.

The computing systems on which the CTIS system may be implemented may include a central processing unit, input devices, output devices (e.g., display devices and speakers), storage devices (e.g., memory and disk drives), network interfaces, graphics processing units, accelerometers, cellular radio link interfaces, global positioning system devices, and so on. The computing systems may include servers of a data center, massively parallel systems, and so on. The computing systems may access computer-readable media that include computer-readable storage media and data transmission media. The computer-readable storage media are tangible storage means that do not include a transitory, propagating signal. Examples of computer-readable storage media include memory such as primary memory, cache memory, and secondary memory (e.g., DVD) and other storage. The computer-readable storage media may have recorded on them or may be encoded with computer-executable instructions or logic that implements the CTIS system. The data transmission media are used for transmitting data via transitory, propagating signals or carrier waves (e.g., electromagnetism) via a wired or wireless connection.

The CTIS system may be described in the general context of computer-executable instructions, such as program modules and components, executed by one or more computers, processors, or other devices. Generally, program modules or components include routines, programs, objects, data structures, and so on that perform particular tasks or implement particular data types. Typically, the functionality of the program modules may be combined or distributed as desired in various embodiments. Aspects of the CTIS system may be implemented in hardware using, for example, an application-specific integrated circuit (ASIC).

The following paragraphs describe various embodiments of aspects of the CTIS system. An implementation of the CTIS system may employ any combination of the embodiments. The processing described below may be performed by a computing device with a processor that executes computer-executable instructions stored on a computer-readable storage medium that implements the CTIS system.

In some embodiments, one or more computing systems are provided for generating a 3D segmentation of a target volume from views collected during a scan of a target volume. The one or more computing systems include a computer-readable storage medium that stores computer-executable instructions for controlling the one or more computing system and one or more processors for executing the computer-executable instructions stored in the computer-readable storage medium. The instructions include instructions of a feature map layer that inputs the views and outputs a 2D multi-channel feature vector for each pixel of the views. The 2D multi-channel feature vectors for a view represent a 2D multi-channel feature map of that view. The instructions include instructions of a 2D-to-3D transform layer inputs the 2D multi-channel feature maps and outputs the 3D multi-label map that represents a 3D segmentation of the target volume. In some embodiments, the feature map layer includes, for each view, a 2D CNN that inputs that view and outputs a 2D multi-channel feature vector for each pixel of that view. In some embodiments, the 2D CNNs and the 2D-to-3D transform layer are trained using views of training volumes. Each training volume may be labeled with a 3D segmentation. In some embodiments, the 2D CNNs may include weights that are learned based on a loss function that factors in the weights of the 2D CNNs in parallel. In some embodiments, the 2D-to-3D transform layer includes a space carver layer that inputs the 2D multi-channel feature maps and outputs a 3D channel volume for each channel. The 3D channel volume for a channel may include a feature for each voxel that is derived from feature values of the 2D multi-label feature maps for that channel. In some embodiments, the 2D-to-3D transform layer further includes a combining layer that combines the 3D channel volumes for the channels to generate the 3D multi-label map for the target volume. In some embodiments, the instructions further include instructions to generate a 3D image of the target volume based on the 3D multi-label map of the target volume. In some embodiments, the feature map layer includes a 2D CNN that inputs each of the views. In some embodiments, the feature map layer includes, for each view, a 2D CNN that inputs that view and outputs a 2D multi-channel feature vector for each pixel of that view, and each 2D CNN includes a downsampling path and an upsampling path. In some embodiments, the downsampling path includes pooling operators and the upsampling path includes upsampling operators. In some embodiments, the scan is an X-ray scan.

In some embodiments, a method performed by one or more computing systems is provide for generating a 3D segmentation of a target volume from views collected during a scan of a target volume. The method accesses accessing views of an X-ray scan of a target volume. The method generates a 2D multi-channel feature map for each view. The 2D multi-channel feature map for a view includes a feature vector for pixel of the view with a feature value for each channel. The method generates a 3D channel volume for each channel based on the 2D multi-channel feature maps. The method generates a 3D multi-label map that represents a 3D segmentation of the target volume based on the 3D channel volumes. The method outputs an indication of the 3D multi-label map. In some embodiments, the generating of the 2D multi-channel feature map for a view applies a 2D CNN to the view where each view has a separate 2D CNN are trained in parallel. In some embodiments, the generating of a 3D channel volume for a channel applies a space carver technique to the feature values of the 2D multi-channel feature maps for that channel. In some embodiments, the generating of the 3D multi-label map combines the values of the 3D channel volumes and applies a softmax function to generate a probability distribution for each voxel of the 3D multi-label map. In some embodiments, the method further generates a 3D image of the target volume is based on the 3D multi-label map of the target volume.

In some embodiments, a method performed by one or more computing systems is provided for training a machine learning system to generate a 3D segmentation of a target volume from views of the target volume. The method accesses training data represent training views of training volumes. Each training volume is labeled with a 3D segmentation of that training volume. The method performs the following until a termination condition is satisfied. For each view, the method applies a 2D convolutional neural network (CNN) to that view where each 2D CNN outputs a 2D multi-channel feature vector for each pixel of that view. Each 2D CNN has weights, and the 2D multi-channel feature vectors for a view forming a 2D multi-channel feature map for that view. For each channel, the method applies a space carver to each of the feature values of the 2D multi-channel feature maps to generate a 3D volume for each channel. The space carver has weights for each channel. The method applies a combining layer to the 3D volumes for the channels to generate a 3D multi-label map representing a 3D segmentation of the image. The combining layer has weights. The method generates new values for one or more of the weights. The method applies a loss function to determine whether the termination condition is satisfied. In some embodiments, the views of a target volume represent views of an X-ray scan. In some embodiments, the views are generated from X-ray scans of target volumes.

In some embodiments, one or more computing systems are provided for generating a 2D segmentation of a slice of a target volume from views collected during a scan of a target volume. The one or more computing systems includes a computer-readable storage medium that stores computer-executable instructions for controlling the one or more computing system and one or more processors for executing the computer-executable instructions stored in the computer-readable storage medium. The instructions include instructions of a feature map layer that inputs the views and outputs a 1D multi-channel feature vector for each pixel of the views that corresponds to the slice. The 1D multi-channel feature vectors of a view represents a 1D multi-channel feature map for that view. The 1D-to-2D transform layer inputs the 1D multi-channel feature maps and outputs a 2D multi-label map that represents the 2D segmentation of the slice of the target volume.

Although the subject matter has been described in language specific to structural features and/or acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

We claim:

1. One or more computing systems for generating a 3D segmentation of a target volume from views collected during a scan of a target volume, the one or more computing systems comprise:

a computer-readable storage medium that stores computer-executable instructions for controlling the one or more computing system, the instructions include instructions of:

a feature map layer that inputs the views and outputs a 2D multi-channel feature vector for each pixel of the views, the 2D multi-channel feature vectors for a view represent a 2D multi-channel feature map of that view; and a 2D-to-3D transform layer inputs the 2D multi-channel feature maps and outputs the 3D multi-label map that represents a 3D segmentation of the target volume; and a processor for executing the computer-executable instructions stored in the computer-readable storage medium.

2. The one or more computing systems of claim 1 wherein the feature map layer includes, for each view, a 2D CNN that inputs that view and outputs a 2D multi-channel feature vector for each pixel of that view.

3. The one or more computing systems of claim 2 wherein the 2D CNNs and the 2D-to-3D transform layer are trained using views of training volumes, each training volume labeled with a 3D segmentation.

4. The one or more computing systems of claim 3 wherein the 2D CNNs include weights that are learned based on a loss function that factors in the weights of the 2D CNNs in parallel.

5. The one or more computing systems of claim 1 wherein the 2D-to-3D transform layer includes a space carver layer that inputs the 2D multi-channel feature maps and outputs a 3D channel volume for each channel, the 3D channel volume for a channel includes a feature for each voxel that is derived from feature values of the 2D multi-label feature maps for that channel.

6. The one or more computing systems of claim 5 wherein the 2D-to-3D transform layer further includes a combining layer that combines the 3D channel volumes for the channels to generate the 3D multi-label map for the target volume.

7. The one or more computing systems of claim 1 further including instructions to generate a 3D image of the target volume based on the 3D multi-label map of the target volume.

8. The one or more computing systems of claim 1 wherein the feature map layer includes a 2D CNN that inputs each of the views.

9. The one or more computing systems of claim 1 wherein the feature map layer includes, for each view, a 2D CNN that inputs that view and outputs a 2D multi-channel feature vector for each pixel of that view and wherein each 2D CNN includes a downsampling path and an upsampling path.

10. The one or more computing systems of claim 9 wherein the downsampling path includes pooling operators and the upsampling path includes upsampling operators.

11. The one or more computing systems of claim 1 wherein the scan is an X-ray scan.

12. A method performed by one or more computing systems for generating a 3D segmentation of a target volume from views collected during a scan of a target volume, the method comprising:

accessing views of an X-ray scan of a target volume;

generating a 2D multi-channel feature map for each view, the 2D multi-channel feature map for a view includes a feature vector for pixel of the view with a feature value for each channel;

generating a 3D channel volume for each channel based on the 2D multi-channel feature maps;

generating a 3D multi-label map that represents a 3D segmentation of the target volume based on the 3D channel volumes; and outputting an indication of the 3D multi-label map.

13. The method of claim 12 wherein the generating of the 2D multi-channel feature map for a view applies a 2D CNN to the view, each view having a separate 2D CNN are trained in parallel.

14. The method of claim 12 wherein the generating of a 3D channel volume for a channel applies a space carver technique to the feature values of the 2D multi-channel feature maps for that channel.

15. The method of claim 12 wherein the generating of the 3D multi-label map combines the values of the 3D channel volumes and applies a softmax function to generate a probability distribution for each voxel of the 3D multi-label map.

16. The method of claim 12 further comprising generating a 3D image of the target volume is based on the 3D multi-label map of the target volume.

17. A method performed by one or more computing systems for training a machine learning system to generate a 3D segmentation of a target volume from views of the target volume, the method comprising:

accessing training data represent training views of training volumes, each training volume labeled with a 3D segmentation of that training volume; and until a termination condition is satisfied, for each view, applying a 2D convolutional neural network (CNN) to that view where each 2D CNN outputs a 2D multi-channel feature vector for each pixel of that view, each 2D CNN having weights, the 2D multi-channel feature vectors for a view forming a 2D multi-channel feature map for that view;

for each channel, applying a space carver to each of the feature values of the 2D multi-channel feature maps to generate a 3D volume for each channel, the space carver having weights for each channel;

applying a combining layer to the 3D volumes for the channels to generate a 3D multi-label map representing a 3D segmentation of the image, the combining layer having weights;

generating new values for one or more of the weights; and applying a loss function to determine whether the termination condition is satisfied.

18. The method of claim 17 wherein the views of a target volume represent views of an X-ray scan.

19. The method of claim 18 wherein the views are generated from X-ray scans of target volumes.

20. One or more computing systems for generating a 2D segmentation of a slice of a target volume from views collected during a scan of a target volume, the one or more computing systems comprise:

a computer-readable storage medium that stores computer-executable instructions for controlling the one or more computing system, the instructions include instructions of:

a feature map layer that inputs the views and outputs a 1D multi-channel feature vector for each pixel of the views that corresponds to the slice, the 1D multi-channel feature vectors of a view represents a 1D multi-channel feature map for that view; and a 1D-to-2D transform layer inputs the 1D multi-channel feature maps and outputs a 2D multi-label map that represents the 2D segmentation of the slice of the target volume; and a processor for executing the computer-executable instructions stored in the computer-readable storage medium.

* * * * *